US008856895B2

(12) United States Patent  
Perrot

(10) Patent No.: US 8,856,895 B2
(45) Date of Patent: Oct. 7, 2014

(54) AUTHENTICATION SYSTEM

(75) Inventor: Didier Perrot, Paris (FR)

(73) Assignee: In-Webo Technologies S.A.S., Paris (FR)

( * ) Notice: Subject to any disclaimer, the term of this patent is extended or adjusted under 35 U.S.C. 154(b) by 327 days.

(21) Appl. No.: 13/061,213

(22) PCT Filed: Oct. 6, 2009

(86) PCT No.: PCT/FR2009/001186
§ 371 (c)(1),
(2), (4) Date: Feb. 28, 2011

(87) PCT Pub. No.: WO2010/043779
PCT Pub. Date: Apr. 22, 2010

(65) Prior Publication Data
US 2011/0185407 A1    Jul. 28, 2011

(30) Foreign Application Priority Data

Oct. 15, 2008 (FR) ...................................... 08 56997

(51) Int. Cl.
G06F 7/04        (2006.01)
G06F 15/16       (2006.01)
G06F 17/30       (2006.01)
H04L 29/06       (2006.01)
H04L 9/32        (2006.01)
G06F 21/34       (2013.01)

(52) U.S. Cl.
CPC .............. *H04L 9/3273* (2013.01); *H04L 63/08* (2013.01); *G06F 21/34* (2013.01); *H04L 9/3236* (2013.01)
USPC ........................................................... 726/6

(58) Field of Classification Search
CPC ..... G06F 21/34; H04L 9/3273; H04L 9/3236; H04L 63/08; H04L 63/083; H04L 63/102

USPC .................................................................. 726/6
See application file for complete search history.

(56) References Cited

U.S. PATENT DOCUMENTS 5,937,068 A  *  8/1999  Audebert ....................... 713/185
7,865,738 B2 *  1/2011  Buck et al. .................... 713/184
(Continued)

FOREIGN PATENT DOCUMENTS

WO    WO 02/17555      2/2002
WO    WO 2006/075917   7/2006

OTHER PUBLICATIONS

International Search Report dated Mar. 2, 2010 for Application No. PCT/FR2009/001186.

*Primary Examiner* — Kambiz Zand
*Assistant Examiner* — Benjamin Kaplan
(74) *Attorney, Agent, or Firm* — Blakely Sokoloff Taylor & Zafman LLP

(57) ABSTRACT

The invention relates to an authentication system for a user possessing a means (3) for authentication at an authentication entity (1), said authentication means including a means (11) for storing at least one status variable and a single-use access-code generator (2) actuated upon a request of the user, said access code including at least one unpredictable portion and being transmitted to the authentication entity for validation, said validation authenticating the user at the authentication entity, characterised in that the status variable is updated in a random manner by and upon the initiative of the authentication means systematically and before any generation of a new access code, in that the generator is suitable for computing the access code using the status variable once it is updated, and in that the authentication entity is adapted for modifying the value of at least one internal status variable during the at least partial validation of the access code by using information previously known by the authentication entity as well as the unpredictable portion conveyed by the transmitted access code.

14 Claims, 4 Drawing Sheets

(56) References Cited

U.S. PATENT DOCUMENTS 8,266,441 B2 * 9/2012 Inskeep et al. .............. 713/185
2004/0172535 A1 9/2004 Jalobsson et al.
2010/0253470 A1 * 10/2010 Burke .......................... 340/5.82
2012/0210127 A1 * 8/2012 Kameda et al. ............. 713/168

* cited by examiner

AUTHENTICATION SYSTEM

The present invention relates to a remote-service authentication system.

Currently, many remote services on the internet or on computer and telecommunication networks in general use means for authenticating their users.

Most frequently, this authentication takes place by means of an identifier and a password to be entered by the user in a greeting form. However, this solution which is simple and well accepted by the users is considered to provide a low level of security. For example, the passwords chosen by the users are easy to guess and specialist software programs are capable of finding the password in a few minutes for too many users.

Therefore, various solutions have been proposed for obtaining a secure authentication suitable for the services that have serious issues such as, for example, access to banking operations.

A large majority of these solutions is based on the use of a particular security device, most frequently a smartcard or chip card capable of acting as an electronic strongbox for storing secret cryptographic keys and carrying out certain cryptography computations. The drawback of this solution is that it obliges the user to carry an additional object. Moreover, it becomes necessary to provide an interfacing device in order to allow the smartcard to communicate with the service requiring this powerful authentication.

It would therefore be particularly advantageous to obtain a security level equivalent to that which is provided by a smartcard by using objects already in the possession of the user such as, for example, his cellphone, his pocket computer or PDA, or even his personal computer.

To solve one or more of the drawbacks cited above, the system for authenticating a user has a means (3) of authentication with an authentication entity (1), said authentication means comprising means (11) for storing at least one state variable and a generator (2) of a single-use access code that can be actuated at the request of the user, said access code comprising at least one unpredictable portion and being transmitted to the authentication entity for validation, this validation authenticating the user with the authentication entity, characterized in that said state variable is updated in a random manner by and on the initiative of said authentication means, systematically and prior to each generation of a new access code, in that said generator is suitable for computing said access code by using said at least one state variable once the latter has been updated, and in that said authentication entity is suitable for modifying the value of at least one internal state variable during the at least partial validation of said access code by using for this information previously known to said authentication entity and the unpredictable portion conveyed by the transmitted access code.

This makes it possible advantageously to deal with the problems of desynchronization to which such devices are subject, as is the case when a user does not transmit the code or codes generated by a device with a counter, or for a device with a clock where the power supply or the clock setting cannot be guaranteed over time, as is the case for example with a cellphone. An additional advantage arising from this is that it does not require the insertion of external resynchronization mechanisms, these mechanisms being either costly when, for example, the user must contact the remote service provider in order to carry out the resynchronization, or not very consistent from the point of view of security, that is to say in fine from the point of view of the effectiveness of the authentication system when, for example, the server validating the authentication authorizes a wide range of possible values for the counter or the clock so that the possibly unreasoned usages of the user keep the counter or the clock in this range.

Moreover this makes it possible to advantageously deal with the security problems well known to those skilled in the art, problems encountered by devices in which the authentication means is a software program that is not based on a hardware security element, the authentication means then being able to be copied and analyzed and the security of the system compromised; similarly, the problem described below is advantageously handled when the authentication means is a software program requiring the user to enter a short secret key, said key being simple for those skilled in the art to find, without carrying out transactions with the server validating the authentication whether or not this key is stored by the authentication means.

Particular features or embodiments are:
each state variable is updated by a one-way function Fx having as input parameters at least one secret specific to said authentication means.
at least one first and one second usable authentication level such as the access code is computed according to the first or the second level, the second level including the entry by the user of a secret code used as an input parameter of the function Fx.
the authentication means comprises a plurality of state variables updated by the function Fx, said function Fx consisting of a pyramid of subfunctions having said state variables as input parameters so that a state variable updated by one of the subfunctions of Fx is not used by the latter as an input parameter.
it includes a first, a second and a third authentication level, the number of state variables updated varying as a function of the authentication level applied such that:
  in the first authentication level: a state variable is updated, the other two state variables being used as input parameters to the subfunction of Fx;
  in the second authentication level: two state variables are updated, the third being used as an input variable, and
  in the third authentication level: the three state variables are updated and none of the state variables is used as an input variable.
it also comprises an authentication client and the third authentication level using this client, said authentication client comprising a secret and being suitable for generating a second access code based on the access code generated by the authentication means, said second access code being suitable for authenticating the user with the authentication entity.
the generator comprises means for generating a first number based on a one-way function Gx the input parameters of which comprise the or at least one updated state variable.
the generator comprises:
  a one-way function Ex for generating a second number and comprising as input parameters:
    the secret of the authentication means;
    the random number,
  a function having an inverse function suitable for combining the first and the second number which are generated by the functions Gx and Ex, the combined number representing the access code and the inverse function being suitable for generating the first number and the second number based on the access code.
the authentication entity is suitable for verifying the validity of the second number and the validity of the first number in a distinct manner.

during the verication of validity, the authentication entity updates internal states.

at least one input parameter of the function Gx is a state variable updated with an unpredictable item of information generated by the authentication means during a previous access-code generation step.

the authentication means and the authentication entity each comprise a clock and the authentication means is suitable for using a time gap between a reference time and the time of its clock in computing the access code and the authentication entity is suitable for validating an access code only if it has received it in a determined time interval relative to the time for generating said access code.

since the system allows the authentication of the user to a plurality of services, an access code is generated by the authentication means by using a code specific to a given service so that its validation by the authentication entity gives access to said service only.

the authentication means is suitable for computing a first access code by using at least one code specific to the service, to the authentication means and a time gap and the authentication entity is suitable for computing a second access code specific to the service, to the authentication means and for transmitting it to the user so that the latter can compare it with the first access code and thus identify the service with certainty, said first and second access codes being identical only if the computing of the first access code by the authentication means is carried out in a determined time interval relative to the time for computing the second secret code by the authentication entity and the codes used specific to the service, to the authentication means, are the same.

The invention will be better understood on reading the following description given only as an example and with reference to the appended figures in which.

Figure 1:
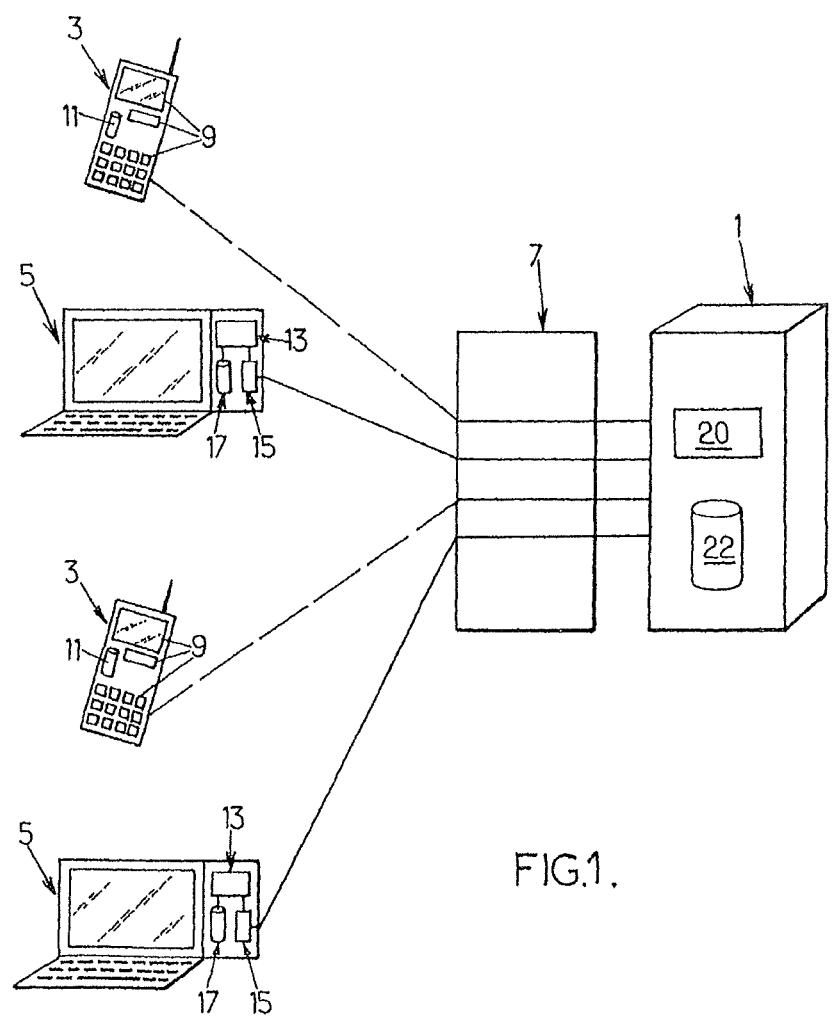
FIG. 1 is a schematic view of an authentication system according to one embodiment of the invention.

With reference to FIG. 1, an authentication system comprises an authentication entity 1 acting as an authentication server, one or more authentication means 3 and one or more authentication clients 5. The authentication means 3 and the authentication clients 5 are held by users of the system.

A server 7 plays the role of authentication manager for implementing the interfaces and functionalities necessary for a secure and multiservice use of the authentication means, clients and entity, the latter optionally being third-party to this description.

The authentication entity 1 and the authentication manager 7 may or may not be combined on one and the same physical server.

The authentication means 3 comprise programmable computing and user-interface means 9. The user interface comprises in particular means for entering a secret code, for example a numeric keypad, and means for viewing and/or transmitting an access code M. Specifically, the access code M is transmitted to the authentication entity either directly via a data link, or viewed by the user on a screen of the authentication means and then entered by this user in an authentication window or transmitted orally, or by DTMF frequency modulation, to a voice server for example. The authentication means also comprise means 11 for storing one or more state variables i, j, k and a secret K1 that is unique for each means. For example, the authentication means 3 can be programmed in a cellphone having program-execution means such as a Java virtual machine.

The clients 5 also comprise programmable computing and user-interface means 13 and means 15 for transmitting data with the authentication entity 1, for example via the internet network. In particular, the clients 5 comprise means 17 for storing a unique secret $K_3$ for each client, this secret being able to take the form of a pair of private/public keys ($pK_3$, $sK_3$) of a public-key cryptographic algorithm. The clients 5 are typically implemented on computers such as desktop computers, laptop computers or pocket computers or cellphones.

The authentication manager 7 is an intelligent interface between the authentication means 3 and the authentication entity 1. This interface is transparent in the authentication protocol described below and is therefore optional in the application of the latter. However, in a real environment, the authentication manager provides the functionalities necessary to a user-friendly and effective operation of the authentication system in its environment, that is to say its users and the services using the authentication system to provide the users with access to their services. Therefore the authentication manager 7 notably provides the following functionalities:

access control of the entity managing the services using the authentication system: load spreading, authentication, management and security of the connections and requests;

processing of the authentication requests to these services emanating from these entities: routing, enhancement by static or dynamic data, response;

processing of the management or administration requests emanating from these entities, whether they be requests concerning the system or the end users: secure creation and activation of an account that can apply, for example, an algorithm of the Diffie-Hellmann type for the secure transmission of secrets generated by the initially "inert" authentication means, addition and deletion of a service such as remote service, remote use of a payment card or loyalty card, management of rights, etc.;

controlling access of the authentication clients: authentication, load spreading, management and security of the connections and requests;

processing of the requests for managing the accounts of the end users emanating from the authentication clients: management of rights, service requests, addition, deletion or management of means or authentication/identification clients, addition or management of account-restoration means;

access control and processing of requests made online (notably associated with the restoration of user accounts): authentication, load spreading, processing of requests; and administration functions of the authentication system.

The authentication entity 1 comprises, in addition to the computing means 20, means 22 for storing, for each authentication means and each authentication client, the secret K1, the secret K3 or, in the public-key cryptographic version, the public key pK3, the symmetrical state variables ii, jj, kk of the state variables i, j, k of the authentication means, a constant secret corresponding to the secret code of the user in a hashed form, error counters and preferably a data stack π.

Figure 2A:
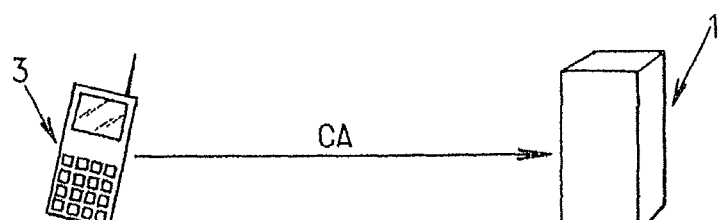
FIGS. 2A, 2B and 2C are schematic views of the operation according to three different options of the system of FIG. 1.
Figure 2B:
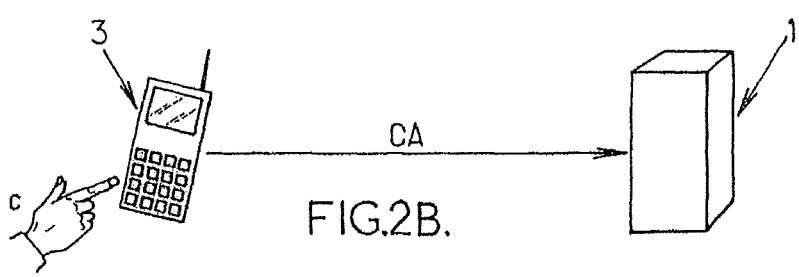

The operation of the authentication system and of the authentication protocol will now be explained with reference to FIGS. 2A, 2B and 2C.

The authentication of a user with a service is carried out by the transmission of an access code CA which is verified by the authentication entity 1. If this code is valid, the authentication entity allows the user to access the requested service.

The authentication system comprises three operating modes reflected by three options A, B and C for the generation of an access code by the authentication means.

Options A and B generate an access code for authentication to a service using the authentication system. Option A, FIG. 2A, allows an authentication with 1 factor based on the secret K1 held by the authentication means. Option B, FIG. 2B, allows an authentication with 2 factors: the secret K1 held by the authentication means and a secret c entered by the holder.

Figure 2C:
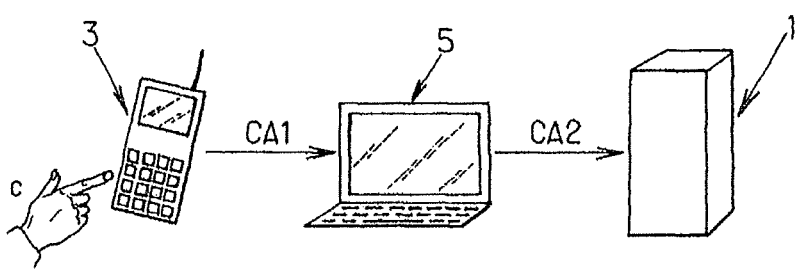

Option C, FIG. 2C, generates an access code $CA_1$ for connecting to the authentication client which carries out the operation of transmitting the access code $CA_2$ to the authentication entity, a different access code from that computed by the authentication means. Option C allows an authentication with 3 factors: the secret K1 held by the authentication means and a secret c entered by the holder as for option B and the secret K3, or the pair sK3/pK3 held by the authentication client.

The choice of the option to be used for authentication is usually left to the discretion of the user since C does not have the same function as A and B: C, from the point of view of the holder, is used for the connection to the authentication client, while A and B are used for authentication with a service using the system.

The decision to use A rather than B or the reverse is also up to the holder. Option A generates an access code uniquely linked to the authentication means so that an attacker obtaining this means can pass himself off as the holder. Option B generates an access code associated with the authentication means and with a personal secret that the holder enters to obtain an access code. The personal secret of the holder is not stored in the authentication means but the access code generated will be exact only if the personal secret entered by the user is also exact.

However, certain conditions of the system may oblige the user to use one option rather than another. In particular, the authentication means carries out several checks associated with the synchronous and asynchronous usages of the various options, and can if necessary on the basis of these checks force the entry of the personal code of the holder by imposing the use of option B instead of option A. These conditions will be explained below, with reference in particular to the management of errors by the system.

Figure 3:
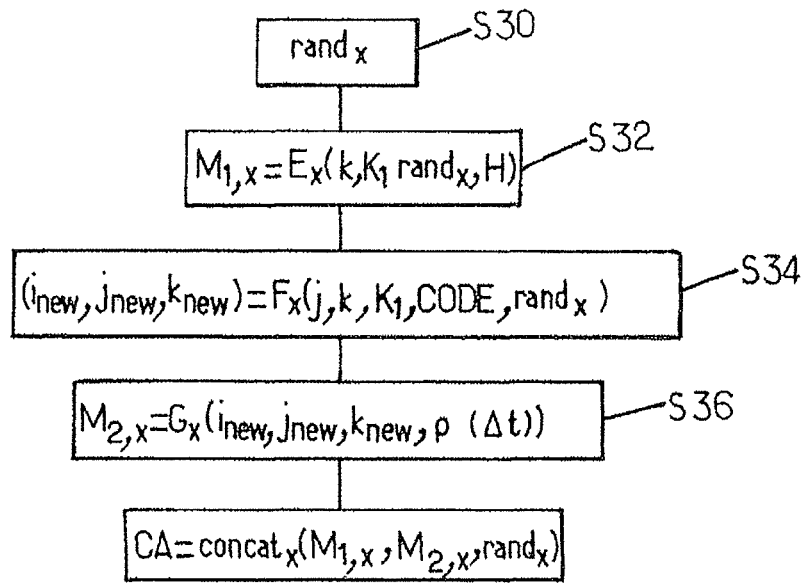
FIG. 3 is a flowchart of the computing of an access code by an authentication means of the system of FIG. 1.

The generation of the access code by the authentication means for option x comprises, FIG. 3, the following steps:

generation, step S30, of a pseudo-random number $rand_x$;

computing, step S32, of a first number $M_{1,x}$ by a function $E_x$ having as input parameters one of the state variables k, the secret $K_1$ and the random number $rand_x$, namely:

$$M_{1,x} = E_x(k, K_1, rand_x) \quad \text{(equation 1)}$$

computing, step S34, of new values $i_{new}, j_{new}, k_{new}$ for the state variables i, j, k by a function $F_x$ having as input parameters the state variables j, k, the secret $K_1$, the random number $rand_x$ and a CODE number omitted in option A, and optionally a serial number SN( ) function associated with the authentication means, namely:

$$(i_{new}, j_{new}, k_{new}) = F_x(j, k, K1, CODE, SN(\ ), rand_x) \quad \text{(equation 2)}$$

computing, step S36, of a second number $M_{2,x}$ by a third function $G_x$ having as input parameters the newly computed state variables $i_{new}, j_{new}, k_{new}$ and the result of a time function $\rho$ of a time interval $\Delta t$ between a reference time and the time of execution of computing the access code, namely:

$$M_{2,x} = G_x(i_{new}, j_{new}, k_{new}, \rho(\Delta t)) \quad \text{(equation 3)}$$

computing, step S38, of the access code by a function $concat_x(M_{1,x}, M_{2,x}, rand_x)$ making it possible to generate $M_{1,x}, M_{2,x}, rand_x$ based on the access code. $concat_x$ is a bijective function of concatenation of its input parameters, the inverse of which is the function marked $separe_x$. $concat_x$ can optionally have cryptographic properties such as the application of a symmetric-key encryption algorithm if the security analysis carried out as part of an implementation recommends it. Moreover, $concat_x$ may optionally concatenate its input parameters by interleaving bits, so that advantageously an error in the input of the access code by the holder does not affect one input parameter independently of the others.

The index x symbolizes the option A, B or C and $E_a$ corresponds to the version of the function E used for option A.

In general, the functions $E_x$, $F_x$ and $G_x$ are one-way functions, that is to say that knowing the result does not make it possible to work back to the input parameters. The hash functions are examples of one-way functions that are well known in cryptography.

The functions $E_x$, $F_x$ and $G_x$ are not secret (they are notably known to the authentication means and to the authentication entity).

The functions $E_x$ are used in particular to verify that the emitter of the access code does indeed have the authentication means.

Each step will now be described in detail, in particular in its particular features of operation depending on the type of option chosen.

For the equation 1, $E_a$ and $E_b$ are a function neither of i nor of j, $E_c$ is a function of none of the state variables, that is to say not of i, or of j, or of k.

It should be noted that, if $E_a$ or $E_b$ were a function of j, it would be possible, after an unsuccessful hacking attempt on option B, to carry out a brute force attack on the personal secret of the holder, by multiple iteration on the initial internal state. This attack could not be detected by the authentication entity because, since j has been updated by the authentication entity following the first unsuccessful attempt as will be seen below, $MM_1$ is incorrect while the personal secret used for the attack is incorrect.

Moreover, if $E_a$ were a function of j, the desynchronization of this internal state would be harmful to the usage of the holder (the risk of losing a step).

Similarly, if $E_c$ were a function of k, the desynchronization of this internal state would be harmful to the usage of the holder (the risk of losing a step). On the other hand, it is not a problem that $E_c$ is not a function of k, since for $MM_1$ to be correct for option C in the event of transmission via the authentication client, it is the authentication client that must be the holder; and it is not possible for an attacker to test a value of the personal secret of the holder with option C without having the authentication client of the holder.

For equation 2, the functions $F_x$ are used for updating the internal states i, j and k with the following particular feature. $F_a$ returns a simple value and updates only the internal state i. $F_b$ returns a pair of values and updates only i and j. $F_c$ returns a triplet of values and updates i, j and k. Moreover, $F_a$ is not a function of i and $F_b$ is not a function of i or of j, $F_c$ is not a function of i, or of j, or of k. In other words, the functions $F_x$ do not have as input parameters the state variable(s) that they update.

It is advantageous that the updating takes place before the computing of the access code in order to minimize the consequences of a desynchronization for the holder. As will be seen below, the authentication means updates its internal states unconditionally at the time of each generation of an access code, while the authentication entity does not usually update the corresponding internal states unless the authentication is successful.

The number CODE corresponds to a constant e or to a hash value of the secret code c entered by the user when using modes B or C. It should be noted that, with option A, the function $F_a$ does not necessarily use e as a parameter.

The internal states are therefore updated both
in a random manner (use of $rand_x$) that can be observed via the access code transmitted;
and in a deterministic but secret manner by the use of secrets K1 and c, or even j and k, but that cannot be observed via the access code transmitted.

Therefore,
the correct updating of i with option A requires knowing j, k and K1 (the secret arguments of Fa);
the correct updating of i and j with option B requires knowing k, K1 and c;
the correct updating i, j and k with option C requires knowing K1, K3 and c.

Concerning the equation 3, the functions $G_x$ are one-way and all depend on the same arguments $i_{new}$, $j_{new}$, $k_{new}$ and $\rho(\Delta t)$.

The only additional requirement relating to the choice of functions $F_x$ and $G_x$ is that their multiple composition $G_{x(n)}$ $oF_{x(n)} oG_{x(n-1)} oF_{x(n-1)} o \ldots$ does not converge on a fixed point (or a cycle) irrespective of the sequence (x(n), x(n−1), ... ) selected by the usages of the holder. This requirement is not truly a requirement if secure (optionally truncated) hash functions are used as one-way functions, such as MD5, SHA256, etc. It should moreover be noted that the arguments of these functions do not converge on any subset because a random number $rand_x$ is inserted on each generation of an access code and therefore the results of these functions have hardly any risk of converging on a value or on a cycle of values if the composition of the functions does not itself converge in the functional sense.

The value $\Delta t$ is defined as the time interval separating a previous access-code request $t_{ref}$ and the current request t.

The function $\rho$ is a function of $\Delta t$ defined on the basis of a second function $\lambda$ in the following manner:

$$\lambda(\Delta t) = E(\Delta t / \delta_2) \bmod N_2 \quad \text{(equation 4)}$$

$$\rho(\Delta t) = \lambda(\Delta t) \text{ if } \lambda(\Delta t) \leq \gamma_M, \text{ and } \rho(\Delta t) = \lambda(\Delta t) + \sigma \text{ else} \quad \text{(equation 5)}$$

where $\gamma_M$, $\delta_2$, $N_2$ and $\sigma$ are strictly positive integers. $\delta_2$ is the encoding pitch and $\delta_2 . N_2$ is the pseudo period of $\lambda$. In practice, $N_2$ can be chosen to be arbitrarily large, for example as the largest integer that can be represented by the authentication means, and can therefore be omitted from the computations below. E( ) in this instance designates rounding to the lower integer. $\sigma$ is chosen arbitrarily and to be sufficiently large, that is to say greater than $\gamma_M + \beta$, where $\gamma_M$ and $\beta$ are strictly positive integers defined precisely in the rest of this description.

In light of equations 1 to 3, it can be seen that at most 4 parameters are updated on each access-code request: i, j, k and $t_{ref}$ which takes as its value the time corresponding to this access-code request. Therefore, if the authentication means detects that the access code has not been used, for example because the user has pressed on a cancel key, these 4 parameters are kept in their state prior to the access-code request.

Figure 4:
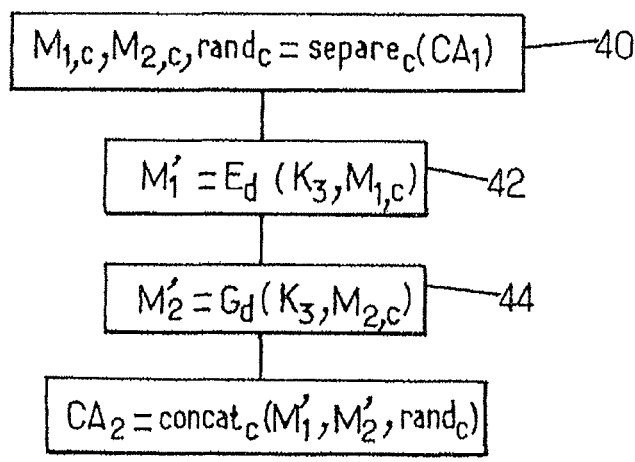
FIG. 4 is a flowchart of the computing of an access code by an authentication client of the system of FIG. 1.

In the case of option C, FIG. 4, the access code generated by the authentication means is transferred to the authentication client.

The authentication client computes, step S40, the numbers ($M_1$; $M_2$; rand) by applying the function $separe_c$ to the access code and then computes the numbers:

$M'_1$, step S42, as being equivalent to $E_d(K_3; M_{1,c})$, that is to say $Ed(k; K_1; K_3; rand_c)$ if the access code has been entered correctly and it does indeed involve the authentication client of the holder;

$M'_2$, step S44, as being equivalent to $G_d(K_3; M_{2,c})$, that is to say $G_d(i_{new}; j_{new}; k_{new}; K_3; \rho(\Delta t))$ in the same conditions.

The access code $CA_2$ transmitted by the authentication client is then $concat_c(M'_1; M'_2; rand_c)$, step S46.

$K_3$ is the secret associated with the authentication client. Since the access code is transmitted by electronic means to the authentication entity, there is no constraining limitation on the size of the access code computed and transmitted by the authentication client. Because of this, the functions $G_d$ and $E_d$ can be, depending on the implementations of the invention, either one-way functions known both to the authentication client and to the authentication entity, or signature functions of the message $M'_1$, respectively $M'_2$, with an asymmetric cryptography method in which $K_3$ plays the role of private key $sK_3$. In this second case, the authentication entity has the public key $pK_3$ associated with $sK_3$ in order to verify the validity of the signatures, that is to say in this case that of the access code transmitted.

The advantage of asymmetric cryptography, compared with the use of one-way functions and of secrets known to the authentication client and to the authentication entity, lies in the fact that it is secure even if the authentication entity is compromised (the authentication entity does not have the means to generate $M'_1$ or $M'_2$, but only to verify whether they are correct). Subject to the adequate but conventional security of the authentication manager, it is therefore possible to have authentication by option C as the basis of operations that are very sensitive for the overall security of the system (for example, a changing of the personal secret code of the holder, management of the authentication means of the holder, etc.).

The use of asymmetric cryptography can be extended to options A and B in implementations of the invention in which the access code generated by the authentication means is transmitted to the authentication entity without entry or speech by the holder, or with signature methods considered sufficiently short in the context of an implementation so that the generated access code can be transmitted to the authentication entity by the holder.

Figure 5:
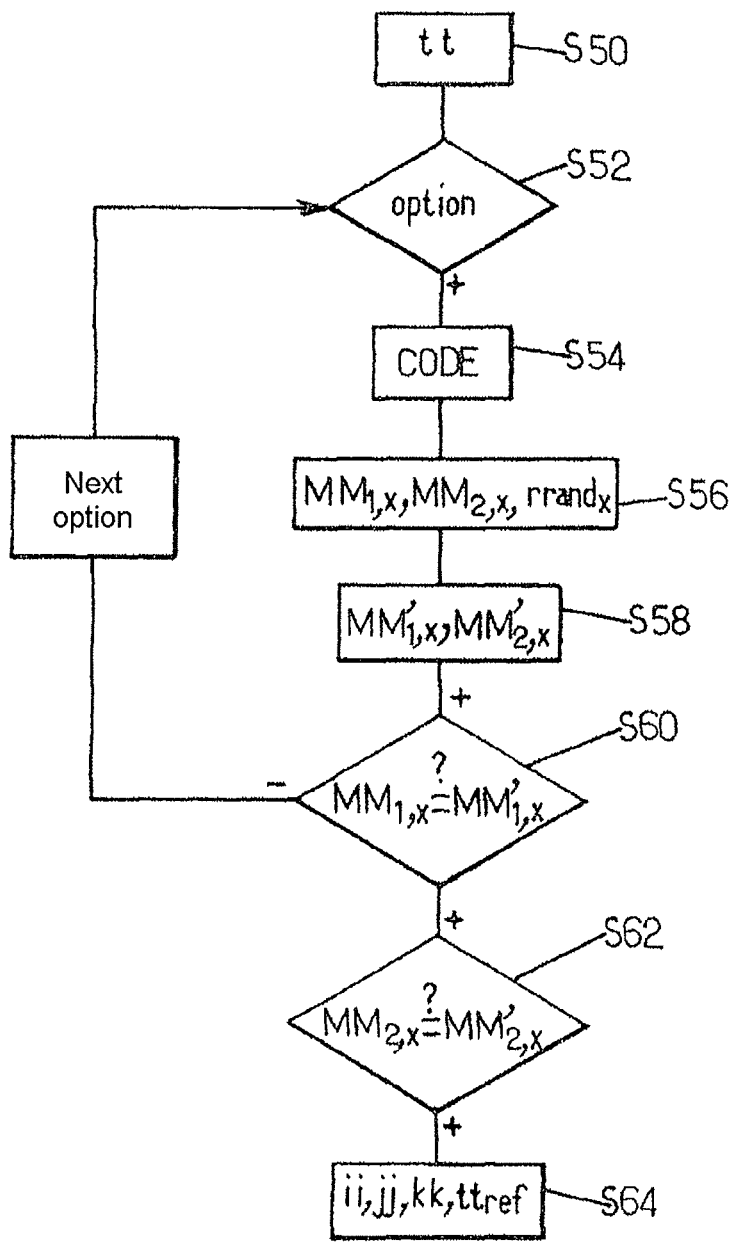
FIG. 5 is a flowchart of the verification of an access code by an authentication entity of the system of FIG. 1.

The authentication entity verifies, FIG. 5, the received access code by carrying out the following steps:
measuring, step S50, the current time of the system clock of the authentication entity and noting tt its value;
looping back, step S52, to the type of option, in the knowledge that, if the access code has been transmitted by the authentication client, the loop amounts to option C. Otherwise, the entity tests option B, then A, then C.
determination, step S54, of CODE depending on the option. For option A, CODE is not used or is a constant and, for the other options, it is the hash value of the secret code;

computing, step S56, of the numbers ($MM_{1,x}$, $MM_{2,x}$, $rrand_x$) by applying the function $separe_x$ to the access code;

computing, step S58, of the values $MM'_{1,x}$, $MM'_{2,x}$ by using the functions $E_x$ and $G_x$ and the secrets held by the authentication entity, secrets that are symmetrical with those held by the authentication means and, for option C, the authentication client. Also used is the time gap $\Delta tt$ between a possible reference time $tt_{ref}$ of the authentication entity and the time tt and the new state variables ii, jj and kk are computed with the function $F_x$;

verification, steps S60, S62, that $MM_{1,x}$, $MM_{2,x}$ and $MM'_{1,x}$, $MM'_{2,x}$ correspond. This step and the previous step conventionally correspond to the verification of a code in symmetric cryptography with secret key;

if the access code is validated, in addition to access to the service, the authentication entity updates, step S64, its internal variables ii, jj, kk and $tt_{ref}$ so as to remain synchronized with the authentication means.

It is understood that a particularly sensitive element of the system is keeping the authentication means synchronized with the authentication entity.

For this, an explanation will be given initially of the problem of synchronizing the clocks and therefore the times $t_{ref}$, $tt_{ref}$, t and tt making it possible to obtain a time gap having a value that is common between the two. In particular, it is advantageous that the system be robust to differences between the clocks.

Let $P_{min}$ be the minimum transmission time for an access code to the authentication entity, namely the time of entry by the holder plus the transmission time, in an implementation in which the holder must enter the access code;

$P_{val}$ be the time during which a generated access code is considered to be valid;

$P_{max}$ be the time, greater than $P_{val}$, beyond which it is reasonable to think that the holder will not transmit the access code if he has not done it before, knowing that this code is no longer valid;

$t_m$ be the minimum time, and $t_M$ be the maximum time in which it is reasonable to think that the holder will make a second authentication attempt if the first one failed.

Note the following $\alpha = E((P_{val} - P_{min})/\delta_2)$;

$\beta = E((P_{max} - P_{min})/\delta_2)$;

$\gamma_m = E(t_m/\delta_2)$;

$\gamma_M = E(t_M/\delta_2)$.

This gives $\Delta t = \Delta tt + \Delta_o - \Delta_t$, where $\Delta_t = tt - t$ and $\Delta_o = tt_{ref} - t_{ref}$.

We deduce from this that $\lambda(\Delta t) = \lambda(\Delta tt) + E(\Delta)$, where $\Delta = (r + \Delta_o - \Delta_t)/\delta_2$ and $0 \leq r < \delta_2$.

We assume $P_{min} < \Delta_o < P_{val}$.

Three situations can arise:

if the access code is received during the validity time by the authentication entity, that is to say $P_{min} < \Delta_t < P_{val}$, this gives $E(-(P_{val} - P_{min})/\delta_2) < E(\Delta) < 1 + E((P_{val} - P_{min})/\delta_2)$ and finally $-\alpha \leq E(\Delta) \leq \alpha$, since $E(\Delta)$ is an integer.

If the access code is received after the validity time but before the maximum entry time, that is to say $P_{val} < \Delta t < P_{max}$, this gives $E(-(P_{max} - P_{min})/\delta_2) < E(\Delta) < 1$ and finally $-\beta \leq E(\Delta) \leq 0$, since $E(\Delta)$ is an integer.

Finally, if $\Delta t$ is between $t_m$ and $t_M$ seconds, this gives $\gamma_m \leq \lambda(\Delta t) \leq \gamma_M$ Reciprocally, if $\lambda(\Delta t) - \lambda(\Delta tt)$ is equal to a relative integer a, then $E((r + \Delta_0 - \Delta_t)/\delta_2) = a$, that is to say $a \leq (r + \Delta_0 - \Delta_t)/\delta_2 < a+1$ hence $P_{min} - (1+a) \cdot \delta_2 < \Delta_t < P_{val} + (1-a) \cdot \delta_2$ The result of this is as follows for the 3 situations examined above:

If the authentication entity recognizes as valid an access code such that $-\alpha \leq E(\Delta) \leq \alpha$, then an access code received after $P_{val} + (1+\alpha) \cdot \delta_2$ will not be considered valid.

If the authentication entity recognizes as authentic, although timed out, an access code such that $-\beta \leq E(\Delta) \leq -\alpha - 1$, then an access code received after $P_{max} + (1+\beta) \cdot \delta_2$ will not be considered authentic.

If the authentication entity recognizes as valid an access code such that $\gamma_m \leq \lambda(\Delta t) \leq \gamma_M$, then the validity of an access code is guaranteed even in the case of desynchronization if it has been generated in a time between $\gamma_m \cdot \delta_2$ and $(\gamma_M + 1) \cdot \delta_2$ after the previous access-code generation.

Moreover, if the access code is received after $P_{val}$, a correction has to be made on tt, so that, when the next access code is received, the condition $P_{min} < \Delta_0 < P_{val}$ continues to be valid. This is the case if $\lambda(\Delta t) - \lambda(\Delta tt)$ is equal to a relative integer a such that $P_{val} \leq P_{min} - (1+a) \cdot \delta_2$, that is to say if $a \leq -\alpha - 1$. Therefore for $a \in [-\beta; -\alpha-1]$, tt is updated at the end of the access-code verification operations with the value $tt + (a+\alpha) \cdot \delta_2$. It should be noted that this correction:

does not detect all the cases of out-of-time entry, because the entry between $P_{val}$ and $P_{max}$ may result in $E(\Delta) \in [-\beta; 0]$; now, an undetected out-of-time entry creates a "disruption" that can result, in the next step, although not very probably, in a rejection of a valid access code and in-time entry. It is however possible to protect against this problem by accepting as valid a code such that $E(\Delta) = \alpha + 1$, which represents an additional computation for the authentication entity;

does not totally or systematically control the disruption when the out-of-time entry is detected and corrected as indicated above. It is however possible to protect against this problem in practice by accepting as valid a code such that $E(\Delta) \in [\alpha+1; \beta]$ when a correction of tt has been made during one of the two previous authentication attempts in which the access code was recognized as authentic, which represents a negligible additional computation for the authentication entity, this situation not being very probable.

Finally, like $\alpha > \gamma_M + \beta$, the third situation examined above is perfectly distinguishable from the other two. If this condition were not fulfilled, two of the above situations might not be distinguishable in certain cases, thus leading the authentication entity to decide arbitrarily whether the access code is valid although not synchronized or correctly entered out of time therefore not valid, and therefore also to decide arbitrarily whether or not to make the correction of $tt_{ref}$.

The absolute accuracy of the clock of the authentication means is of no use since the only thing that is of interest is the time differences; similarly, the difference between the clocks of the authentication means and of the authentication entity is of no importance since it is simplified in all the difference computations.

The relative accuracy of the clock of the authentication means over long periods is also unnecessary because either the holder will have used the authentication means in this interval or—at worst—the first access code will not be recognized as authentic.

It is, however, important that the relative accuracy of the clock of the authentication means over a period of the order of that of "normal" use of the authentication means by the holder guarantee that the maximum difference introduced between the clocks of the authentication means and of the authentication entity be at most of the order of $P_{val}$. In practice, this places no real constraint on this clock.

In addition to the clock-synchronization problems solved by the means explained above, it is understood that, in a production environment, the system must also be robust to keying errors and to hacking attempts which generate desynchronizations of the state variables i, j, k while preserving the security of the access code.

For this, in the embodiment shown, use is made of a mixture of options A, B and C, the retention of the histories of usage of the access codes and the updating of the states i, j, k according to certain conditions.

The authentication means has a flag $option_B$.

If options B or C are used, the flag $option_B$ is set to FALSE.

If the authentication means is aware of the fact that the authentication attempt using the generated access code has failed for option A (for example, the holder may have an option on the authentication means for indicating that the authentication attempt has failed), the internal state $option_B$ is set to TRUE.

Option B is forced (thus being substituted for option A chosen by the holder) in several cases:

failure of an authentication attempt with option A: if the cause of this failure was a desynchronization of the internal state j between the authentication means and the authentication entity, the use of option B allows the resynchronization. This case is not checked by the authentication entity (no rejection of an access code generated with option A after an authentication failure irrespective of the option);

number of consecutive uses of option A exceeding a threshold set during the design of the system. The purpose of this is to limit the number of valid access codes that it is possible to generate without entering the personal secret of the holder, notably in the case of theft of the authentication means. Optionally and additionally, access to the authentication means may be restricted by a simple password. A second object of this check is to ensure a minimal refresh speed for the internal state j. A similar check is carried out by the authentication entity with a slightly less severe threshold so as not to cause failure of the authentication if option B were not forced soon enough on the side of the authentication means;

number of consecutive uses of option A within a set time period that is greater than a threshold set during the design of the system. The objective is similar, this check being aimed more specifically at blocking the "preventive storage" of access codes with option A in the event of theft of the authentication means. This check is also carried out by the authentication entity which verifies that the number of consecutive authentication attempts made with authentic access codes generated for option A such that $\lambda\square[\gamma_m; \gamma_M]$ does not exceed a threshold set during the design of the system.

In the event of successive failures—and failures that are sufficient in number—of option B that can only be the result of repeated errors in the entry of the holder's identifier or of a blocking of option B, the authentication means proposes that the holder regenerate the secrets of the authentication means so as to unblock option B. The number of possibilities of unblocking with 2 authentication factors (authentication means and personal secret code of the holder) is also checked by the authentication entity by virtue of the internal state $erreurcode_B$ and limited to a value slightly higher than that of $seuilcode_B$. Beyond this value, option B can no longer be unblocked by virtue of the authentication means alone; to do this, the holder must use option C and the authentication client.

The checks explained above make it possible in particular—it is not their sole objective—to check the speed of refresh of the internal states. It is also necessary to ensure that the probability that an access code that is already generated can again be generated is infinitesimal, and to reject it if such a code is proposed for an authentication because it will almost certainly be an attempted attack.

For option C, the number of triplets (i, j, k) possible —that is to say the number of access codes supposing that $K_1$, c, $\lambda(\Delta t)$ are fixed—is equal, if the function $G_c$ and the generation of the random numbers $rand_c$ are correctly implemented, to $Rand_c$ the number of random words $rand_c$ possible. The implementations must therefore on the one hand choose $Rand_c$ to be sufficiently large, on the other hand check at the authentication client that the frequency of renewal of the secret code c is sufficient, for example by forcing a renewal of c after a number of connections to the authentication client that is equal to $Rand_c/P_c$, where $P_c$ is a threshold to be set during the design of the system. If the authentication means does not store the values of $rand_c$ used between two renewals of c, $P_c$ must be set so that the probability of generating the same value of $rand_c$ a second time is infinitesimal. The "anniversaries theorem" indicates that this threshold is low, therefore, in implementations in which $Rand_c$ is itself relatively low, and to prevent too rapid a frequency of renewal of c, priority should be given to using, for the generation of $rand_c$, a pseudo-random generator the features of which ensure that it is possible to generate a large portion of the $Rand_c$ values of $rand_c$ possible without risk of collision. The authentication entity then stores the access codes generated with option C (or the random words $rand_c$) between two renewals of c and rejects an access code already used (or an access code generated with a random word $rand_c$ already used).

For option B, the number of possible pairs (i, j)—that is to say the number of access codes supposing that k, K1, c, $\lambda(\Delta t)$ are fixed—is equal, if the function $G_B$ and the generation of the random numbers $rand_B$ are correctly implemented, to $Rand_B$ the number of random words $rand_B$ possible. The implementations must therefore on the one hand choose $Rand_B$ to be sufficiently large, on the other hand check that the frequency of renewal of k—a as a minimum—is sufficient. The authentication entity then stores the access codes generated with option B (or the random words $rand_B$) between two renewals of k and rejects an access code already used (or an access code generated with a random word $rand_B$ already used).

For option A, the number of possible internal states i —that is to say the number of access codes supposing that j, k, K1, c, $\lambda(\Delta t)$ are fixed—is equal, if the function $G_a$ and the generation of the random numbers $rand_A$ are correctly implemented, to $Rand_A$ the number of random words $rand_A$ possible. The implementations therefore choose on the one hand $Rand_A$ to be sufficiently large, and on the other hand check that the frequency of renewal of j—a as a minimum—is sufficient, which is carried out above by one of the checking mechanisms forcing the use of option B. The authentication entity stores the access codes generated with option A (or the random words $rand_A$) between two renewals of j and rejects an access code already used (or an access code generated with a random word $rand_A$ already used).

Therefore the synchronization of the internal states i, j, k and $t_{ref}$ between the authentication means and the authentication entity is carried out by several means:

the change to a "higher" option, for example from option A to option B (that is to say resynchronizing more internal states out of i, j, k) in the event of failure of the authentication;

the storage by the authentication entity in a data stack π of the moments of reception of access codes for which M1 is correct but M2 is false;

the detection of access codes that are authentic but received out of time by the authentication entity, or do not correspond to the necessary option;

the updating of the internal states by the authentication entity conditional upon the supply of an authentic access code;

the limited authorization of access codes for which $\lambda \square [\gamma_m; \gamma_M]$, that is to say generated immediately after another access code to take account of the situation in which this first access code has not been received by the authentication entity.

This range of means makes it possible to prevent any desynchronization in the event of a single keying error by the holder, namely the non-transmission of an access code generated when the holder notifies the authentication means thereof, if such an option exists;

the incorrect transmission of the generated access code or of the identifier of the holder for the service requiring the authentication. In these cases, the authentication entity receives no access code or does not recognize it as emanating from the holder.

the entry of an incorrect personal code for the use of options B or C the out-of-time transmission of an access code the use of an incorrect option.

In the case of desynchronization resulting from a multiple keying error, the resynchronization is guaranteed, in the worst case, at the time of the second correct authentication attempt made by the holder.

This range of means makes it possible on the other hand to prevent any desynchronization due to an access attempt if the attacker has the authentication means or a duplicate, but not the personal secret of the holder or the authentication client of the holder, including for option A because the data stack π is not emptied if authentication is successful with option A; and a fortiori if the attacker does not have the authentication means.

It is understood however that a possible desynchronization and protection against attacks mean that, in the authentication entity, the algorithm for verifying the access code is modified to take account of these risks.

x, n, λ are made to vary in concentric algorithmic loops (the deepest being that on x, then on n, then on λ) in their respective definition assembly:

x designates the access-code generation option, only amongst option C if the access code has been transmitted by the authentication client, and successively B, A, C otherwise;

the index n of $\Delta tt_n = tt - tt_{n,n}$ for each value $tt_{n,n}$ stored in π, beginning with the value stored most recently (hitherto designated as $tt_{ref}$);

λ with the successive positive or null integers amongst
[$\sigma + \lambda(\Delta tt_n) - \alpha$; $\sigma + \lambda(\Delta ttn) + \alpha + 1$]
[$\gamma_m$; $\gamma_M$] for options B and C
[$\sigma + \lambda(\Delta tt_n) + \alpha + 2$; $\sigma + \lambda(\Delta tt_n) + \beta$] only if a correction of $tt_{ref}$ has been made during one of the two previous authentication attempts in which the access code was recognized as authentic
[$\sigma + \lambda(\Delta tt_n) - \beta$; $\sigma + \lambda(\Delta tt_n) - \alpha - 1$]

Despite the apparent complexity, the number of computations made by the authentication entity remains very limited in practice for normal usage of the authentication means:

1 to 3 computations of $MM_{1,x}$ to determine the option x used to generate the access code because the following options are not looked at when a match for $MM_{1,x}$ has been found;

1 to $2\alpha+1$ computations of $MM_{2,x,n,\lambda}$ to determine the correct value of λ (a choice of parameters such that $\alpha=1$ is possible and therefore pertinent)

The computations can be more numerous:

when there is an out-of-time entry of the access code: up to $\beta-\alpha$ additional computations of $MM_{2,x,n,\lambda}$, that is to say 2 for a typical choice of the parameters;

if the authentication means is used by the attacker to generate successive access codes with option A: up to $(2\alpha+1)*seuil_A$ additional computations where $seuil_A$ is the maximum number of successive access codes generated with option A accepted by the authentication entity;

if there are attacks attempted after theft of the authentication means, or if there is incorrect entry of the personal secret code by the holder: up to $(2\alpha+1)*(seuil_{codeA}+seuil_{codeB})$ additional computations, or even $(2\alpha+1)*(seuil_{codeA}+seuil_{codeB}+seuil_{codeC})$ if the user, an attacker or the holder, also has the authentication client of the holder. $seuil_{codeX}$ designates the maximum number of consecutive errors (within option x) accepted by the authentication entity before blocking the use of this option.

These numbers multiply when the causes accumulate, but since they are independent of one another, the probability of occurrence of such accumulations is low. In any case, the only cause of additional computations that can be directly induced by an attack having the authentication means of the holder is that which leads to carrying out, in the worst case, $(2\alpha+1)*(seuil_{codeA}+seuil_{codeB})$ additional computations, which is insufficient to bring an attack in denial of service on the authentication system that is the subject of this invention if it is correctly dimensioned.

Inside these loops, the following steps are carried out:

CODE takes the value e for option A, and H(cc), the hash value of the secret code, for options B and C.

The numbers $(MM_{1,x}; MM_{2,x}; rrand_x)$ are computed by applying the function $separe_x$ to the access code. When the access code is obtained by the authentication entity via the authentication client, the function $separe_c$ supplies $MM'_1$ and $MM'_2$; $MM_1$ and $MM_2$ are then computed based respectively on $MM'_1$ and $MM'_2$ by using the asymmetric cryptography method and the public key pK3 or the symmetric secret K3.

An integer marked $MM'_{1,x}$ is computed as being the equivalent of $E_x(kk; K_1; rrand_x)$ Verification of the validity of $MM_{1,x}$ seuil is initialized at $seuil_{min}$;

if $tt-tt_{last} < seuil$ and the access code has not been transmitted via the authentication client, if $MM'_{1,x}$ and $MM_{1,x}$ are equal for an option x and $rand_x$ has not already been used for this option, $erreur_{M1}$ is set to zero, seuil is set to $seuil_{min}$, $tt_{last}$ is set to tt, tt is added to the data stack π. The addition of tt to the stack limits the possible impact of this mechanism on the holder by preventing any desynchronization of the authentication means relative to the authentication entity;

otherwise, $erreur_{M1}$ is incremented and, if $erreur_{M1} \geq seuil_{M1}$, seuil is set to the maximum value permitted by the implementation;

in any case, the authentication is rejected and the operations of verifying the access code are stopped. This mechanism aims to prevent any attack by brute force on the access code by rejecting without examining it any access code if the time since the examination of the last access code is less than seuil.

If tt−tt$_{last}$≥seuil or the access code has been transmitted via the authentication client,
  if MM'$_{1, x}$ and MM$_{1, x}$ are equal for an option x and rand$_x$ has not been used for this option, erreur$_{M1}$ is set to zero, seuil to seuil$_{min}$, tt$_{last}$ to tt and the verification operations of the access code continue as described below;
  otherwise, erreur$_{M1}$ is incremented, the authentication is rejected, the operations stopped and if erreur$_{M1}$≥seuil$_{maxM1}$, seuil is set to the maximum value permitted by the implementation.

If the index x corresponds to option A and the value of erreur$_{codeA}$ is greater than seuil$_{codeA}$, the operations of verification of the access code are stopped, the authentication is rejected;

If the index x corresponds to option B and the value of erreur$_{codeB}$ is greater than seuil$_{codeB}$, the operations of verification of the access code are stopped, the authentication is rejected;

If the index x corresponds to option C and the access code has been supplied via the authentication client and the value of erreur$_{codeC}$ is greater than seuil$_{codeC}$, the operations of verification of the access code are stopped, the authentication is rejected.

(ii$_{new}$; jj$_{new}$; kk$_{new}$) are computed (for each new value of x) with the value F$_x$(jj; kk; K1; code; SN( ); rrand$_x$) as explained above.

A number marked MM'$_{2, x, n, A}$ is computed as being equivalent to G$_x$(ii$_{new}$; jj$_{new}$; kk$_{new}$; λ)

If MM'$_{2, x, n, \lambda}$ and MM$_{2, x}$ are equal, the access code is authentic for option x and the parameters n and λ, and it is stored, or the word rand$_x$ is stored, associated with option x. The analysis of the other options and parameters is not continued. The operations terminate with the updating of the internal states and the following conclusions:
  (ii; jj; kk) are updated with the values (ii$_{new}$; jj$_{new}$; kk$_{new}$);
  the data stack π is emptied except for option A;
  tt is stored in the data stack π;
  for an index x corresponding to option A, erreur$_{codeA}$ is set to zero;
  for an index x corresponding to option B, erreur$_{codeA}$ and erreur$_{codeB}$ are set to zero;
  for an index x corresponding to option C, and if the access code has been supplied via the authentication client, erreur$_{codeA}$, erreur$_{codeC}$ and erreur$_{codeB}$ are set to zero.

If x does not correspond to the expected option, the authentication is rejected and only the last test below is looked at:
  If λ is in [σ+λ(Δtt$_n$)−α; σ+λ(Δtt$_n$)+α+1] or for options B or C in [γ$_m$; γ$_M$], the authentication is accepted and there is no point in carrying out the tests below;
  If λ is in [σ+λ(Δtt$_n$)+α+2; σ+λ(Δtt$_n$)+β] and a correction of tt$_{ref}$ has been made during one of the two previous authentication attempts in which the access code has been recognized as authentic, the authentication is accepted and there is no point in carrying out the test below;
  If λ is in [σ+λ(Δtt$_n$)−β; σ+λ(Δtt$_n$)−α−1], the authentication is rejected and tt$_{ref}$ is updated (including in π) with the value tt+(α−p)·δ$_2$ If MM'$_{2, x, n, \lambda}$ and MM$_{2, x}$ are not equal, the algorithm loops are continued with the other values of λ, n, x. If no case of equality is encountered, the access code is not authentic and the authentication is rejected. The operations of verification of the access code terminate with the updating of the internal states in the following manner
  for an index x corresponding to option B only, (ii; jj; kk) are updated with the values (ii$_{new}$; jj$_{new}$; kk$_{new}$);
  tt is added to the data stack π;
  for an index x corresponding to option A, erreur$_{codeA}$ is incremented by one unit;
  for an index x corresponding to option B, erreur$_{codeB}$ is incremented by one unit;
  for an index x corresponding to option C, and if the access code has been supplied via the authentication client, erreur$_{codeC}$ is incremented by one unit.

If MM$_1$ and MM$_{1, x}$ are equal but MM$_2$ is never equal to MM$_{2, x, n, \lambda}$, the access code is not valid, but there is value in certain cases in updating the internal states ii, jj and kk.

In the case of option A, this represents no risk or value, therefore the update does not take place.

In the case of option B, the update
  represents no security risk to the authentication protocol: an attack on wishing to synchronize with the next authentication step will indeed have to supply a correct personal code, whether or not the update takes place;
  represents no particular risk of desynchronization;
  represents no risk of an attack on the personal code by brute force; this would be the case if the update of the internal states led, during the next authentication attempt to MM$_1$ and MM$_{1, x}$ no longer being equal (an attack "by multiple iteration" would in theory be possible), but MM$_1$ depends neither on ii or on jj, which are the only 2 internal states updated for option B;
  has the advantage, since the state jj is updated according to H(c), that an attacker having succeeded in obtaining the authentication means (or even reverse engineering it) could no longer have a successful authentication with option A because he has made at least one attempt, which is necessarily unsuccessful if he does not know the secret code of the holder, with option B.

In the case of option C, the analysis is slightly different and leads to not updating the internal states ii, jj, kk. Specifically, after this update, if options A or B are used by an attacker, MM$_1$ and MM$_{1, x}$ are no longer equal (since MM$_1$ is a function of k), which in theory allows a brute force attack "by multiple iteration" on the personal secret code that cannot be detected by the authentication entity.

An access code can be used by an attacker who knows it if the following 3 conditions are met:
  the holder has not used it before,
  the attacker uses it before the access-code expiry time, or during the moments of validity after each pseudo-period which can be chosen to be arbitrarily large as has been seen above,
  the holder has, in the meantime, not entered an access code for an option producing the updating of more internal states than the option of the access code entered by the attacker updates.

Except for the cases of theft of the authentication means, this requires that the attacker listen to the authentication channel and carry out an attack reaching the authentication entity before the attempt of the holder. If the attempt of the holder is not blocked or incorrectly directed, the attack can be carried out only by speedily taking over the attempt of the holder: in the context of one implementation, the authentication entity must therefore know how to detect and reject virtually simultaneous authentication requests for one and the same holder and with one and the same access code.

Therefore, the system and the protocol which are described above effectively deal with the technical problem that was assigned to them in that they allow:

- a use for the holder totally masking the underlying complexity, notably that of maintaining the synchronization of the internal states and that of the refreshing of these same internal states;
- a strong authentication that uses neither a physical device for protecting the secret data of the authentication means (such as a smartcard), nor a technical means for transmitting information from the authentication entity to the authentication means, nor a reliable clock throughout the use of the authentication means.

The invention has been illustrated and described in detail in the drawings and the above description. The latter must be considered as illustrative and given as an example and not as limiting the invention to this sole description. Many variant embodiments are possible.

In a first variant, the system comprises an option B' similar in its operation to option B. In the case of desynchronization of k, it is not possible to ask the user to use option C because it is not made for that and also it cannot be made in a "masked" manner since it has to be possible to distinguish the options on the side of the authentication entity. Option B' is then implemented by the authentication means and the authentication entity as an option similar to C in particular for the updating of variables but used as an option B, that is to say with entry of a secret code by the holder, but without the authentication client. In the event of failure of authentication with option B, if the authentication means obtains the information therefrom, the use of option B' is forced. Option B' is also forced to guarantee a minimal refresh speed of the internal state k. Moreover, the authentication entity checks that the use of option B' is justified.

In a second variant, the functions $G_x$ used for computing the word $M_2$ are also a function of the internal states that are not updated. More precisely, $G_b$ is a function of j (in addition to $i_{new}$, $j_{new}$ and $k_{new}$)
$G_{b'}$ is a function of k (in addition to $i_{new}$, $j_{new}$ and $k_{new}$)
$G_c$ is a function of j and of k (in addition to $i_{new}$, $j_{new}$ and $k_{new}$)

The object of this variant is that the personal secret code of a user cannot be the subject of a brute force attack, even in the event of "reverse engineering" of the authentication means by the attacker. Let us suppose specifically that this reverse engineering has taken place, the attacker therefore knows notably $K_1$, SN and (i, j, k) at a given moment. If the attacker subsequently manages to get hold of a valid access code computed by the holder with option C, he can in theory easily carry out a brute force attack on the personal secret code of the holder, since the access code collected depends only on $K_1$ and SN (obtained by reverse engineering), $rand_c$ (contained in the access code), $\rho(\Delta t)$ (on which he can make some assumptions) and H(c). The attack consists in trying to reproduce the value of the access code by varying c and $\rho(\Delta t)$ without transmission to the authentication entity—and therefore with no possible check by the latter.

If, on the other hand, the access code is—irrespective of the option used—a function of one or more untransmitted internal states in the access code and not depending only on the constant values that can be accessed by reverse engineering, the attacker must also take them into account in his brute force attack. In a real implementation, the product of the number of possible values of two internal states by the number of possible personal secret codes is much greater (typically 2^50 greater!) than the number of possible access codes (possibly excluding the word $rand_x$), which amounts to saying that the brute force attack will supply many results (values of the internal states and plausible values of $\rho(\Delta t)$) for all the possible personal secret code values, thus making its true value indiscernible by the attacker. This is also true if the attacker makes the assumption that the access code that he has collected has been generated just after the reverse engineering operation, that is to say makes an attack by varying the words $rand_x$ (smaller than the unknown internal states); in typical implementations of this variant, after 2 to 3 steps of generating an access code after the reverse engineering, the personal secret code becomes indiscernible, a brute force attack producing many results for each possible value of the personal secret code. If the functions $F_x$ used are "sufficiently injective", it is even fairly probable that from the first step, the brute force attack produces too many results (typically 5) to be directly usable by the attacker. The only remaining possibility of brute force attack therefore consists in the attacker intercepting the first access code computed by the holder after the reverse engineering or, as an equivalent, in the hacker intercepting all the access codes (the words $rand_x$) generated between the reverse engineering and the brute force attack, each of these situations being technically possible but not very realistic.

In a variant of this second variant, the internal states that are not updated (i, j, k) are replaced in the computation of Gx by an internal state h. The objective of this variant is to be less sensitive to desynchronization situations that can in practice occur in the second variant, while providing the same advantage in terms of security as that motivating the second variant. For this, the updating of h in step n is carried out by virtue of a one-way function F in the following manner:

$h_{new}$=F(h; $rand_{n-n1}$) where $rand_{n-n1}$ is the random key generated in step $n-n_1$, where $n_1$ is a strictly positive integer. This update is also conditional on the fact that the authentication means has no direct or indirect indication of the non-transmission of the access code generated in step $n-n_1$. In the contrary case, $h_{new}$=h, the internal state is not updated.

On its side, the server must store the values of secret keys during $n_1$ steps and test which value of $h_{new}$ amongst the at most $n_1^2$ possible values makes it possible to explain the transmitted code. Such a variant therefore increases the number of valid codes in a given context, and the implementation must analyze whether the length of the codes is sufficient to ensure the expected level of security. Another advantage of this variant relates to the non-replay of options C or B' which, instead of being simply minimized by increasing the period of reuse of rand for these options, is directly checked, h not—in practice—being periodic.

In a second variant of this second variant, the internal state h and the internal state k are only one state, k therefore being updated by virtue of the function F and not by virtue of a function $F_x$.

In a third variant, the authentication means can generate either an access code dedicated to a service s and only valid for the authentication to the latter, or a common access code that is valid for all of the services that do not require a dedicated access code.

The integer number $m_s$ is defined or computed as:
the constant e if the holder has made the default choice of a common access code, this constant being able to be omitted, the integer $\Phi_s$, if the holder has made the choice of an access code dedicated to the service s.

In this variant, the algorithm for verifying the authentication entity comprises an additional intermediate loop between the loop of the options and the loop of the time gaps based on the possible values of $m_s$ where s is the index designating a service using the authentication system, by beginning with the service from which the access code currently being analyzed emanates, that is to say e, ..., $\phi_s$, ....

Therefore the number of computations can increase up to (2α+1)*S additional computations in the event of an error on the choice of service for which a dedicated access code must be supplied, S being the number of such services declared in the account of the holder.

If, after having verified that $M'_{1,x}$ and $M'_{2,x}$ are valid, s does not correspond to the service from which the access code emanates, the authentication is rejected, but the authentication entity updates its internal states as if the authentication had been correct, so as to remain synchronized with the authentication means. This is notably possible if the integer $m_s$ is used by the functions $G_x$ but not by the functions $F_x$.

In a fourth variant, for a dedicated service, the authentication entity supplies it with a temporary code, specific to the service and to the authentication means of the holder, which the holder can compare with that displayed on his authentication means before supplying an access code.

The authentication entity computes Δtt as tt–$tt_{ref}$ where tt designates the value measured by the internal clock of the authentication entity and $tt_{ref}$ the value stored most recently in the data stack π.

The mutual authentication code supplied to the holder for the service s is computed as D(jj; kk; $K_1$; SN; $m_s$; μ(Δtt)).

The authentication means can then display a code that must reproduce exactly that which is supplied by the service s requiring authentication, notably when s requires a dedicated access code, so that the holder of the authentication means is certain that he is authenticated on s and not on a service seeking to imitate s.

For this, we compute, in a manner parallel to the computation of the authentication entity, Δt as t–$t_{ref}$ where t designates the value measured by the internal clock of the authentication means and the mutual authentication code displayed by the authentication means for the service s as D(j; k; K1; SN( ); $m_s$; μ(Δt)).

D is a one-way function.

μ is an encoding function of Δt defined thus: μ(Δt) is the unique number of the form q·n$δ_M$+δ' in the gap [Δt; Δt+n$δ_M$], where q is a positive or null integer number;

n is a positive or null number chosen during the design of the system;

$δ_M=Q_{val}+P_{val}$, $δ_m=Q_{min}+P_{min}$, $δ_Q=Q_{val}-Q_{min}$, $δ_P=P_{val}-P_{min}$;

0≤δ'<n$δ_M$ is chosen arbitrarily during the design of the system;

$Q_{min}$ is the minimum time accepted between the moment of computation of the mutual authentication code by the authentication entity and the moment of computation of the mutual authentication code by the authentication means. $Q_{min}$ may if necessary be negative if it is accepted that the holder can display the mutual authentication code on the authentication means before requesting the mutual authentication code from the service s. Before a time $Q_{min}$, the mutual authentication code may not be correct;

$Q_{val}$ is the maximum time accepted between the moment of computation of the mutual authentication code by the authentication entity and the moment of computation of the mutual authentication code by the authentication means. After a time $Q_{val}$, the mutual authentication code may not be correct;

$P_{val}$ is the minimum validity time of an access code;

$P_{min}$ is the minimum time taken to transmit an access code generated by the authentication means. $P_{val}$ and $P_{min}$ have already been described in the context of the management of the time intervals.

There is $tt_{ref}-t_{ref}=\phi+\phi_0$ and t–tt=–φ+$\phi_t$ where $\phi_0 \square [P_{min}; P_{val}]$, $\phi_t \square [Q_{min}; Q_{val}]$ and φ is the arbitrary difference, assumed to be constant, but able to vary sporadically, between the clocks of the authentication entity and of the authentication means. We deduce therefrom that Δt–Δtt=$\phi_0$+$\phi_t$ therefore Δt–Δtt$\square[δ_m; δ_M]$. For $\phi_{0t}=\phi_0+\phi_t$ given, the probability p($\phi_{0t}$) that μ(Δtt) and μ(Δt) are different is equal to $\phi_{0t}/nδ_M$. Supposing $\phi_0$ and $\phi_t$ to be equally distributed over their respective definition domain, the probability that μ(Δtt) and μ(Δt) are different is equal to the integral on $[P_{min}; P_{val}]×[Q_{min}; Q_{val}]$ of p($\phi_{0t}$)/($δ_P·Q_Q$), that is to say (1+$δ_m/δ_M$)/2n.

A choice of heightened n improves the probability that the mutual authentication code is correct; it also increases the period during which this code is constant. It is not a real problem because, on the one hand, it involves a few minutes to obtain probabilities higher than 0.95 that the mutual authentication codes displayed and supplied are identical, on the other hand because a service seeking to imitate s cannot know in advance that the holder will seek to be authenticated in a given period of a few minutes.

The radical alternative for working around this probable and uncertain result consists in the mutual authentication code having, as the access code, a random ("challenge") portion, and it being entered by the holder on the authentication means which may or may not accept it. The method is secure, but it is much more complex for the holder, first requiring an entry on the authentication means, then on the service requiring authentication, probably too complex for a consumer application.

When the mutual authentication codes supplied by the service s and displayed by the authentication means are identical, the holder can enter the access code allowing him to identify himself with the service s. When this is not the case (a probability of less than (1+$δ_m/δ_M$)/2n or desynchronization of the authentication means and of the authentication entity), the holder has the choice between "refreshing" the codes supplied by the service and displayed by the authentication means. New codes are computed and supplied/displayed with, on the one hand, an inverted δ' "phase", on the other hand, as a reference time for the computation of Δt and Δtt, the moment of computation of the first mutual authentication code, because this reference time does not change in the event of new refreshing of the codes. This operation makes it possible to resolve the case of a desynchronization of Δt between the authentication means and the authentication entity, and the case in which μ(Δtt) and μ(Δt) are different even when there is no desynchronization. In the latter case, the problem may subsist with a probability (1+$δ_m/δ_M$)/2n since Δt and Δtt have been updated. A new refresh operation—changing the phase but no longer changing the reference time—will solve the problem for sure; this operation on the other hand does not solve the case of a desynchronization of internal states (j, k or δ') between the authentication means and the authentication entity, so the holder must rely on the option below if the difference between supplied/displayed authentication codes persists at the time of successive refreshes: after the first refresh, these codes alternate between 2 values, obtaining an artificial access code displayed by the authentication means, generated with an option B" similar to option B', making it impossible to carry out the authentication successfully, but resynchronizing the internal states between the authentication means and the authentication entity (δ' is for example resynchronized with the parity of $rand_{B''}$, while Δt, j and k are resynchronized by the option B" of the authentication protocol on condition that the holder's personal secret is correctly entered) and thereby making it possible to supply/display identical mutual authentication codes. The taking account of B" by the authentication entity is identical in all respects to that of B' except for the decision to accept the authentication in the event of an authentic code.

In a fifth variant, the authentication means can display a function code of an argument entered by the holder;
of the internal states i, j, k;
of SN( );
of the secret K1, and even of H(c) if it is entered again by the holder.

This code may have different functions and display formats, the display format itself being able to be chosen from several predefined formats by virtue of an item of information contained in the argument entered by the user, or obtained from computations on the latter.

For example, after a successful authentication with a service, the service may, in order to protect a particularly sensitive operation against a "Man In The Middle" attack that has potentially already succeeded but cannot be detected, supply the holder with an IP address which will have been previously encoded and changed in format by virtue of a mask. This mask is supplied by the authentication entity and is a one-way function of the internal states and secrets specific to the holder and to his authentication means. The authentication means then displays "in clear" to the holder the IP address that he must enter in his browser in order to continue the operation, a new authentication possibly being required by the service, since it is a priori a new session. The authentication means has, without it being necessary to transmit information to it that would be likely to be intercepted by the attacker, all the elements allowing it to compute the mask or its inverse, and therefore to apply it to the entered argument in order to find the original information. Alternatively, if the "Man in The Middle" attack is more general and affects the routers of an access provider and not just a "DNS cache" used by the holder, the multifunction code displayed by the authentication means can be used to implement an encrypted session between the web browser of the holder and the site of the service provider.

In a sixth variant, the secret $K_3$ (or the pair $pK_3/sK_3$) stored in the authentication client is encrypted by virtue of a key known to the authentication entity, updated on each successful authentication of the authentication client, and supplied to the authentication client if and only if the transmitted access code (usually generated with option C) is correct.

It should be noted that the implementation shown is dependent on a transmission channel that is transparent for the access code: an input data item is supplied to the recipient in its initial state, irrespective of the transformations that it may have undergone while it is transported. Those skilled in the art can without difficulty adapt this implementation to a semi-transparent channel such as the use of the http-digest authentication mode of the http protocol.

In the claims, the word "comprising" does not exclude other elements and the indefinite article "a/an" does not exclude a plurality.

The invention claimed is:

1. A system for authenticating a user comprising:
a part for authentication with an authentication entity, said authentication part comprising memory, coupled to a processor, for storing at least one state variable and a generator of a single-use access code that can be actuated at a user's request, said access code comprising at least one random part and being transmitted to the authentication entity for validation, said validation authenticating the user with the authentication entity,
wherein said state variable is updated in a random manner by and on the initiative of said authentication part, systematically and prior to each generation of a new access code,
wherein said generator is suitable for computing said access code by using said at least one state variable once said state variable has been updated, and
wherein authentication entity is arranged for modifying the value of at least one internal state variable upon at least partial validation of said access code by using information previously known to said authentication entity and the random part conveyed by the transmitted access code.

2. The system as claimed in claim 1, wherein the authentication part comprises at least three state variables and the authentication entity comprises one and the same number of internal state variables corresponding one by one with the state variables of the authentication part, and wherein said system comprises a first, a second and a third authentication levels, each authentication level using a distinct method for updating at least one of the at least three state variables, the three methods being common to the authentication part and to the authentication entity.

3. The system as claimed in claim 2, wherein:
in the first authentication level, one of the at least three state variables, called the first state variable, is updated by a first one-way function having as input parameters the other state variables, at least one secret key specific to the authentication part and one random key generated by the authentication part prior to each access-code generation;
in the second authentication level, the first state variable and a second state variable amongst the at least three state variables are updated respectively by first one-way functions having as input parameters the other state variables, the at least one secret key specific to the authentication part, the one random key and, at the authentication part, an item of information entered by the user before each access-code generation according to said second level, and, at the authentication entity, a secret key specific to the user, and
in the third authentication level, the at least three state variables are updated respectively by first one-way functions having as input parameters the at least one secret key specific to the authentication part, the one random key and, at the authentication part, an item of information entered by the user before each access-code generation according to said third level, and, at the authentication entity, the secret key specific to the user.

4. The system as claimed in claim 3, wherein, in the first authentication level, the one random key generated by the authentication part cannot take again the same value while the second or the third level have not been applied by the authentication part, and wherein, in the second level, said one random key cannot take again the same value white the third level has not been applied by the authentication part.

5. The system as claimed in claim 4, wherein the authentication part chooses the authentication level that has to be applied according to a set of rules featuring at least one rule indicating that, if the authentication part has direct items of information such as an explicit choice of the user, or indirect items of information such as the repeated usage, sufficiently close in time, of the authentication part by the user, signifying at least probably that the access code generated previously has not been recognized as valid by the authentication entity, then an authentication level that is strictly higher than that otherwise required must be applied, if this required level is not already the third.

6. The system as claimed in claim 3, wherein the generator comprises, for each authentication level, a generator of a first number based on a. second one-way function having the at least one updated state variable as an input parameter.

7. The system as claimed in claim 6, wherein the generator comprises, for each authentication level:
   a third one-way function for generating a second number, having as input parameters at least:
      the secret of the authentication part;
      the one random key; and
   a function having an inverse function suitable for combining the first and the second number which are generated by the second and third functions and the one random key generated by the authentication part, the combined number representing the access code and the inverse function being suitable for allowing the authentication entity to obtain the first number, the second and the one random key based on the access code.

8. The system as claimed in claim 7, wherein the authentication entity is suitable for verifying the validity of the second number and the validity of the first number in a distinct manner.

9. The system as claimed in claim 8, wherein, during the verification of validity, the authentication entity updates the internal states.

10. The system as claimed in claim 2, wherein the authentication part and the authentication entity each have at least one state variable corresponding with one another that is different from the first and from the second state variable, and said state variable is updated by virtue of a one-way function as a function of the current value of said state variable and of the one random key generated by the authentication part during a previous step for generating an access code by said generator.

11. The system as claimed in claim 7, wherein the authentication part and the authentication entity each comprise a clock and the generator of the first number is arranged for using a function of the gap between an actual value of a reference time known to the authentication part and a current time of the clock of the authentication part and the authentication entity is arranged for validating an access code only if it has received said access code within a determined time interval relative to actual values of one or more reference times known to the authentication entity and for updating an own measurement of said reference time or times when the second number is valid.

12. The system as claimed in claim 1, wherein, said system allowing authentication of the user to a plurality of services, an access code is generated by the authentication part by using a code specific to a given service so that validation thereof by the authentication entity gives access only to said service.

13. The system as claimed in claim 12, wherein the authentication part is arranged for computing a first access code by using at least one code specific to the service, to the authentication part and a time gap and the authentication entity is arranged for computing a second access code specific to the service, to the authentication part and for transmitting the second access code to the user so that the user can compare the second access code with the first access code and thus identify the service with certainty, said first and second access codes being identical only if the computing of the first access code by the authentication part is carried out in a determined time interval relative to the time for computing the second secret code by the authentication entity and if the codes specific to the used service and authentication part are the same.

14. The system as claimed in claim 3, further comprising an authentication client, said authentication client comprising a secret and being arranged for generating a second access code based on the access code generated by the authentication part, said second access code being, suitable for authenticating the user with the authentication entity.

* * * * *